United States Patent Office 3,308,557
Patented Mar. 14, 1967

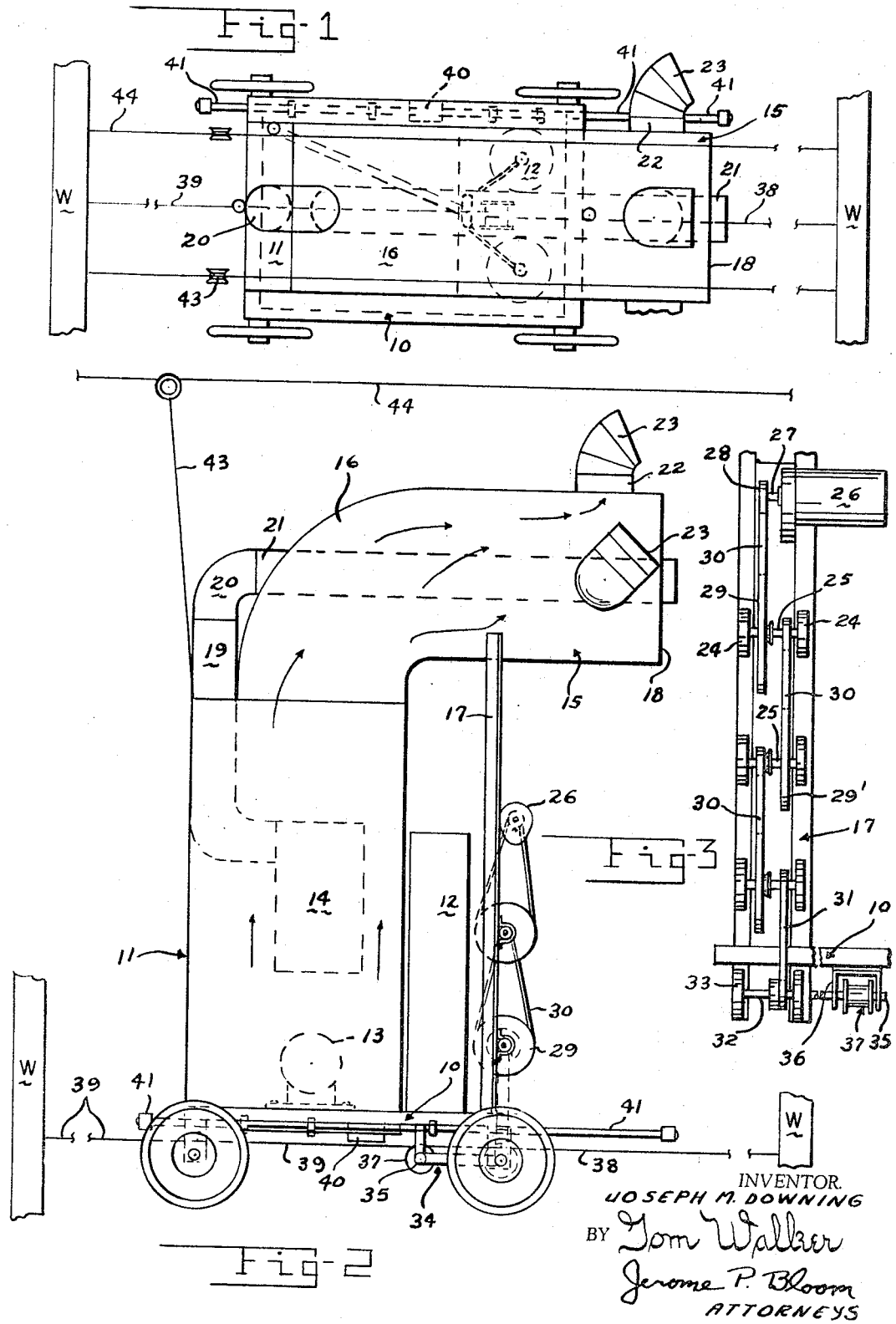

3,308,557
CROP DRYING APPARATUS
Joseph M. Downing, 235 Orchard Drive,
Dayton, Ohio 45419
Filed Dec. 16, 1963, Ser. No. 330,801
5 Claims. (Cl. 34—218)

This invention relates to apparatus providing an improved means for drying crops. It has particular advantage as related to an installation for curing tobacco and will be so described. However, it will be obvious that neither its aplication nor the form of its embodiment need be limited to that described.

In the process of curing tobacco, leaves are picked from the tobacco plants and allowed to wilt. In some instances the complete stalk is allowed to wilt. The leaves or plants are then dried by suspension in a curing shed. In the curing shed the drying process is accelerated by an application of heat. The present invention relates to means by which such heat may be aplied in a more effective and more uniform manner thereby facilitating the production of high quality products.

A primary object of the invention is to provide an improved apparatus for use in drying crops which is economical to fabricate, more efficient and satisfactory in use and adaptable to a wide variety of applications.

A further object of the invention is to provide a novel installation which facilitates the drying of crops in a curing shed and features an improved unit for creating and distributing hot dry air.

Another object of the invention is to provide a mobile heater capable of effective use in the drying and curing of tobacco and similar crops.

An additional object of the invention is to provide in a curing shed, or the like, a mobile heater unit capable of being interconnected to automatically move back and forth between opposite limiting wall structures and, in the process thereof, produce dry heated air and effectively distribute such air to condition or cure adjacent crops.

Another object of the invention is to provide a crop-drying unit possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawing, or their equivalent.

Referring to the accompanying drawing wherein is shown one but obviously not necessarily the only form of embodiment of the invention, FIG. 1 is a top view of a crop drying installation in accordance with the invention shown in schematic form;

FIG. 2 is a side elevation view of the apparatus as shown in FIG. 1; and

FIG. 3 is a schematically illustrated, fragmentary end elevation view of the structure shown in FIG. 2, parts being eliminated for clarity of disclosure.

Like parts are indicated by similar characters of reference throughout the several views.

A preferred embodiment of the invention is shown in schematic fashion in the drawings to include a mobile platform 10. The platform 10 mounts to one end thereof a vertically projected housing 11 and to its other end fuel tanks 12. Based on the platform 10 within the lower portion of the housing 11 is a blower unit 13.

The unit 13 may be of any conventional nature to include an intake opening having access to air through the bottom of the platform 10. It has a discharge opening and on operation thereof provides for a forced draft of air to be delivered therethrough to move interiorly and in a sense vertically of the housing 11.

Fixedly supported within the housing 11 in the path of the aforementioned forced draft of air is a box-like structure, a portion of which provides a combustion chamber 14. In conjunction with the chamber 14 the box-like structure mounts a burner unit which is conventionally formed and suitably connected to the tanks 12 in a manner to provide for a delivery of atomized fuel for ignition in the combination chamber.

Since the chamber 14 is positioned directly in the path of air which moves upwardly from the blower unit 13, a portion of this air is conventionally drawn to the aforementioned burner unit and supplied to the chamber 14 so as to provide the medium to atomize the fuel and the oxygen necessary to support combustion. The major portion of the air from the blower moves about the box-like structure including the chamber 14 and is heated in passage thereby.

It is here noted that the details of the blower unit and the apparatus which is auxiliary to the box-like structure providing the combustion chamber are not described since in and of themselves they afford no pertinent feature of the present invention.

The air from the blower 13 which is heated in passing the combustion chamber seeks an exit opening from the top of the housing 11, to one side thereof. This opening is defined by one arm of a right angled conduit member 15 which projects in a sense vertically of the housing 11. This one arm portion of member 15 is relatively short and connects to its other relatively long arm portion by an intermediate arcuate elbow portion 16. The long arm portion of the member 15 projects outwardly in respect to one end of the platform 10, in a sense parallel thereto, supported intermediate its extermities by an open frame structure 17. The frame 17 extends perpendicular to the platform 10, framing the tanks 12 at one end thereof. Note that the projected extremity of the member 15 is capped by a panel element 18.

A flue pipe 19 connecting at one end to the combustion chamber 14 affords a channeled discharge therefrom of the hot gases which result from combustion. The pipe 19 extends outwardly from the chamber 14 in a sense upwardly of the housing 11 to the one end thereof which is remote from the projected extremity of the member 15. It exits perpendicular to the top of the housing, immediately to the rear of the member 15. Immediately above the housing 11 the pipe 19 includes a right angled elbow portion 20 by means of which it connects to an extension 21. The extension 21 projects through and coaxial with the long arm portion of the conduit member 15. The outermost extremity of the extension 21 projects through the center of the conduit cap 18 to discharge exteriorly thereof the gases of combustion which flow therethrough from the combustion chamber 14.

Adjacent and spaced from its projected extremity, the member 15 includes a circumferentially arranged series of spaced openings, each of which is defined by a short tubular relatively projected pipe 22. Rotatably mounted on and forming an extension of each of the pipes 22 is an arcuate tube section 23. The discharge end of each tube 23 is bridged by a grill formed by spaced metal vanes. The vanes are adjustable and serve to control the direction of discharge.

Referring more particularly to FIGS. 2 and 3 of the drawings, it may be seen therein that the frame structure 17, to the outer face and one side thereof, mounts in vertically spaced relation thereon pairs of transversely aligned bearing brackets 24. Each pair of transversely aligned brackets 24 rotatably supports a jack shaft 25. The shafts 25 are thereby parallel to each other and to the platform 10. Fixedly mounted to the frame 17 at a position above the shafts 25 is a reversible motor 26, the drive shaft 27 of which extends above and generally parallel to the shafts 25. The projected extremity of the shaft 27 mounts a pulley wheel 28. Each shaft 25 below the shaft 27 mounts a pulley wheel 29 co-planar with the wheel 28. Each shaft 25 also mounts to one side of its wheel 29 and spaced therefrom a second pulley wheel 29' and these wheels 29' are also co-planar.

Motor 26 provides a drive from the wheel 28 through a series of pulley belts 30 interconnecting the wheels 28, 29 and 29' to a lowermost jack shaft 25 positioned immediately above the platform 10. A belt 31 provides a drive from the wheel 29' on the lowermost jack shaft 25 to a pulley fixed to a shaft 32. The shaft 32 is rotatably mounted in bearing brackets 33 supported on a frame structure which depends below the platform 10 in vertical alignment with the frame 17. A belt and pulley arrangement provides a drive from the shaft 32 to a shaft 35. The shaft 35 is positioned below the platform 10, intermediate its longitudinal extremities and in a plane parallel thereto which includes the shaft 32. The shaft 35 extends transversely of the platform, spaced there below, to project through the transversely spaced dependent leg portions of a U-shaped bracket 36. Intermediate the dependent legs of the bracket 36 the shaft 35 fixedly mounts a winch 37. The winch 37 mounts two lines 38 and 39, one end of each being fixedly connected to the winch for a purpose to be further described.

It may be seen from the preceding structure that on drive of the motor unit 26 there will be a direct drive of the winch 37. The cables 38 and 39 are so connected to the winch that on drive thereof, irrespective of the direction of such drive, one line will coil on the winch while the other line will be paid out.

Note in the accompanying drawings that below the platform 10 and to one side thereof is a schematically illustrated three pole, double throw switch 40. The switch 40 has a control arm which is mechanically and respectively connected to a pair of rods 41 which extend oppositely therefrom in coaxial relation. The rods 41 are supported in guides depending immediately below the platform. The remote extremities of the rods respectively project beyond the respective ends of the platform and the structure which mounts thereon.

Power is suitably provided for the motor unit 26 through the medium of a pair of trolley units 43 which mount to the housing 11 to vertically project and have the trolley portions on their projected extremities repectively bear on trolley wires 44. The trolley wires are interconnected to and provide a source of power in a conventional manner.

Included in the circuit supplying power to the motor 26 is the blower 13. Thus, energizing of the motor 26 produces a conjoint operation of the blower.

An invention unit as above described is shown in the drawings to be installed between opposite wall structures W of a curing shed, within which shed wilted tobacco leaves and stalks are suspended from a frame type structure. Respectively connected to said opposite wall structures W are the remote extremities of the cables 38 and 39 which are independently attached to the winch 37. A suitable switch may be used to control the delivery of power to the motor 26 through the trolley line. On operation of the switch the motor 26 and the blower may be simultaneously energized. This initiates a drive, as previously described, from the motor shaft 27 to the winch 37. Dependent on the direction of this drive, the winch will, for example, coil the cable 38 thereon and pay out the cable 39. This procedure will cause the mobile platform 10 to move in a direction to approach the one wall structure W to which the cable 38 is connected. As the platform 10 and the apparatus mounted thereon approaches this one wall structure, the rod 41 most adjacent this wall will eventually make contact therewith. On impact between the rod 41 and the wall W the slidably mounted rod is caused to move inwardly of the platform and to thereby move the control arm of the switch 40 which is included in the circuit to the motor 26. This operation of the switch 40 causes a reversal of the direction of the motor drive. As this occurs, the winch will be driven in an opposite direction and the platform 10 caused to move to the opposite wall W in a manner believed obvious.

In the case of the described installation, the movement of the platform 10 and its associated structure is so controlled to be quite slow. However, once this movement is initiated, it is continuous and fully automatic in character. It should be noted that the back and forth movement which is produced in the platform 10 occurs in an automatically regulated straight line. During this movement the blower 13 continuously draws air from the exterior of the housing 11 to produce a forced draft thereof which passes through the housing and exists to the conduit member 15. In passing the combustion chamber, a portion of this air is supplied to the appaartus in association therewith by suitable means to maintain the combustion which occurs therein. As previously described, the major portion of the flow of air developed by the blower 13 moves about the combustion chamber in its travel to the conduit mmeber 15 and is heated in passage thereby. This air is therefore hot as it exists to the conduit member. At the same time, flue gases are being channeled from the combustion chamber through the pipe elements 19, 20, and 21. Since extension 21 passes through the conduit member 15, as previously described, any hot air which enters the conduit member must move about the extension 21 and absorb further heat which radiates from the flue gases which flow therethrough. Thus, the air is dually heated in its movement past the combustion chamber to the projected extremely of the conduit member 15. Here, doubly heated, the air exits through the pipe sections 22 and the sections 23 which swivelly mount thereon. The combination of the elements 23 being swivelly mounted and arcuately formed and having adjustable vanes at their outlets enables the distribution of the heat in various directions as the entire heater structure moves between the walls W.

It may thus be seen that the invention apparatus may be quite effectively used in the process of drying crops. It provides a continuous and automatic production of hot dry air which is doubly heated in a most economical manner. This enables the heat to retain a high heat level as it exits and flows in the area about the wilted leaves which are suspended from suitable framework throughout the curing shed. The fact that the movement of the described apparatus is relatively slow enables the spreading of the heat in a generally uniform and complete fashion. This enables an end product of uniform high quality. Further, not only is the invention structure economical for use in the described application due to the fact that once energized it requires no human control other than termination of its operation, but its use is extremely safe. It substantially eliminates the possibility of inadvertent fires which often cause the loss of crops during the drying process.

While the invention has been described in a particular embodiment and in reference to a particular application, it should nevertheless be obvious from the preceding that neither the application nor the form of embodiment of the invention need be so limited.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A mobile unit for use in a curing shed or the like for accelerated drying of suspended crops, said unit being adapted for a programmed travel within the shed while discharging directed flows of heated air, said unit comprising a mobile platform, wheels on said platform imparting mobility thereto in a longitudinal sense at right angles to the axes of said wheels, a housing installed on and rising from said platform, a conduit communicating at its inner end with the upper end of said housing, said conduit being disposed in said longitudinal sense and projecting in offset relation to said housing, means for blowing heated air under pressure through said housing into said conduit, and outlet means in said conduit discharging the heated air on suspended crops in a peripheral series of directed flows, the outer end of said conduit being closed and said outlet means comprising a plurality of circumferentially spaced generally radial discharge pipes connected in said conduit in advance of said closed outer end, and adjustable air flow directional control means mounted on each of said pipes.

2. A mobile unit for use in a curing shed or the like for accelerated drying of suspended crops, said unit being adapted for a programmed travel within the shed while discharging directed flows of heated air, said unit comprising a mobile platform, means on said platform for generating a flow of heated air and for discharging such flow upon suspended crops, a winch on said platform, cable means connected to said winch and extending in opposite directions therefrom in such manner that paying out of said cable means in one direction results in winding of said cable means on said winch from the other direction, means for anchoring the opposite ends of said cable means, means for rotating said winch, and means alternately reversing the direction of rotation of said winch.

3. A mobile unit for use in a curing shed or the like for accelerated drying of suspended crops, said unit being adapted for a programmed travel within the shed while discharging directed flows of heated air, said unit comprising a mobile platform, wheels on said platform imparting mobility thereto in a longitudinal sense at right angles to the axes of said wheels and relatively elevating said platform, means on said platform for generating a flow of heated air and for discharging such flow upon suspended crops, said means including a conduit projecting in said longitudinal sense in overlying vertically spaced relation to said platform and having outlet means therein, a winch on the underside of said platform, cable means connected to said winch and extending in opposite directions therefrom in such manner that paying out of said cable means in one direction results in winding of said cable means on said winch from the other direction, means for anchoring the opposite ends of said cable means to define a path of travel for said mobile unit, a frame upstanding on said platform in a supporting relation to said projecting conduit, means on said frame connected in a driving relation to said winch, and means responding to predetermined travel of said unit in opposite directions for alternately reversing the direction of rotation of said winch.

4. A mobile unit for use in a curing shed or the like for accelerated drying of suspended crops, said unit being adapted for a programmed travel within the shed while discharging directed flows of heated air, said unit comprising a mobile platform, a housing on said platform projected vertically therefrom, means defining a blower in said housing, means defining a combustion chamber in said housing, conduit means defining an opening from the top of said housing, a flue pipe one end of which is in connection with said combustion chamber and the other end of which projects through said conduit means, said blower having access to the exterior of said housing and being operative to draw air therefrom and deliver a forced draft thereof to move to and about said combustion chamber and exit from said housing through said conduit means, the air being primarily heated in moving about and past said combustion chamber and secondarily heated by radiation from the gases of combustion moving through said flue pipe, and means provided for discharge of the so heated air from said conduit means, said discharge means consisting of a circularly arranged series of pipe elements, each of which defines a discharge opening from said conduit means, and each of said pipe elements having swivelly mounted thereon an arcuately formed discharge tube.

5. A mobile unit for use in a curing shed or the like for accelerated drying of suspended crops, said unit being adapted for a programmed travel within the shed while discharging directed flows of heated air, said unit comprising a mobile platform, a housing mounted on said platform and extending upwardly therefrom, conduit means communicating at an inner end thereof with said housing in an upper part of said housing and projecting in laterally offset relation to said housing, a combustion chamber in said housing, a flue pipe extending from said combustion chamber upwardly in said housing through the upper end thereof and turning to extend longitudinally through said conduit to and through an outer end thereof, means for blowing air upwardly through said housing around said combustion chamber and into said conduit means, the air being primarily heated in moving about and past said combustion chamber and secondarily heated by radiation from the gases of combustion moving through said flue pipe, and means for discharging the heated air from said conduit in currents directed angularly to said flue pipe.

References Cited by the Examiner

UNITED STATES PATENTS

| | | | |
|---|---|---|---|
| 80,906 | 8/1868 | Broome | 263—19 |
| 648,259 | 4/1900 | Hollingsworth | 263—19 |
| 1,344,163 | 6/1920 | Barducci | 34—222 |
| 1,381,054 | 6/1921 | Barducci | 34—222 |
| 1,832,151 | 11/1931 | Stein | 110—49 X |
| 1,909,207 | 5/1933 | Mikody | 110—49 |
| 2,156,101 | 4/1939 | Willett et al. | 126—110 |
| 2,263,732 | 11/1941 | Johnston | 126—110 |
| 2,725,051 | 11/1955 | Hauck et al. | 126—110 |

DONLEY J. STOCKING, *Primary Examiner.*

FREDERICK L. MATTESON, JR., *Examiner.*

C. R. REMKE, *Assistant Examiner.*